United States Patent [19]

Mohan et al.

[11] 3,871,957

[45] Mar. 18, 1975

[54] USE OF MICROORGANISMS TO DISPERSE AND DEGRADE OIL SPILLS

[75] Inventors: Raam R. Mohan, Berkeley Heights; George H. Byrd, Jr., Red Bank; James Nixon, Westfield; Edward R. Bucker, Cranford, all of N.J.

[73] Assignee: Exxon Research and Engineering Company, Linden, N.J.

[22] Filed: May 9, 1973

[21] Appl. No.: 358,640

[52] U.S. Cl................... 195/2, 195/3 H, 195/28 R, 210/11
[51] Int. Cl............................................. C12b 1/100
[58] Field of Search............ 195/3 H, 2, 116, 128 R; 210/2, 11, 15, DIG. 21

[56] References Cited
UNITED STATES PATENTS
3,616,204   10/1971   Linn................................ 195/3 H X 3,769,164   10/1973   Azarowiez.......................... 210/11 X

OTHER PUBLICATIONS

Little, A., "Combating Pollution Created by Oil Spills," Report of Dept. of Transp., pp. 105–107, June 30, 1969.

Primary Examiner—Lionel M. Shapiro
Assistant Examiner—R. B. Penland
Attorney, Agent, or Firm—John Paul Corcoran; Joseph J. Allocca

[57]   ABSTRACT

A new and novel method of preparation and application of specified microorganisms for the rapid dispersal of oil spills found in open seas, along beaches, in coastal areas and along the shore lines and also for protecting beaches and solid surfaces against oil contamination.

6 Claims, No Drawings

USE OF MICROORGANISMS TO DISPERSE AND DEGRADE OIL SPILLS

This invention relates to the utilization of microorganisms for rapidly dispersing and degrading oil spills. In one aspect, this invention relates to a novel method of preparing a broth of viable microorganisms and protecting beaches, shorelines and solid surfaces against oil contamination.

Oil pollution of rivers, streams, harbors, bays, beaches and the open ocean has been increasing in frequency and intensity over the last few years because of tremendous increase in the quantity of crude oil and refined products being transported by water. Oils and oily substances discharged into the sea do not remain floating indefinitely. They are readily adsorbed by clay, silt, skeleton remains of organisms, and other particular matters suspended in the sea. Such adsorption weights the oil causing some of it to sink. This phenomenon is far more common in shallow water or in the sublittoral zone where there is more suspended solids than in the open ocean.

Oily substances reaching the sublittoral or surf zone soon become coated on or mixed with solids. In this form the oil is less likely to be carried back to sea by ebbing tides or by the back rush of water from waves. Some oil may get buried on sandy beaches or under other debris. Its adsorption by solids renders the oil more susceptible to auto oxidation and particularly to microbial oxidation.

Virtually all kinds of gaseous liquid and solid hydrocarbons are attacked by microorganisms. Oxygen, nitrogen and sulfur derivatives are generally oxidized more readily than most unsubstituted hydrocarbons. Many species of marine microorganisms are endowed with the ability to oxidize petroleum hydrocarbons and their derivatives. Such microorganisms are most numerous in shallow marine sediments, marshes, ponds, lagoons and harbors where oil is continuously present. The extent to which oil-oxidizing microorganisms occur in the open ocean is not known.

It is also known that emulsions of oil or thin films are much more susceptible to auto oxidation than large coherent masses. In the first phases of auto oxidation, a free radical chain reaction results in the formation of hydroperoxide and in the second phase, the hydroperoxide is oxidized further with the formation of alcohols, organic acids, esters and ketones. Mineral salts dissolved in sea water catalyze certain auto oxidations. In addition, ultra violet radiation from sunlight also promotes the auto oxidation of hydrocarbons at or near the water surface. Ultraviolet radiations in effect of intensity, penetrate sea water only a few centimeters and it has been found that both chemical oxidation as well as auto oxidation of petroleum oils in storage reservoirs is only from 10 to 15% that of the biochemical oxidation rate.

One of the biggest problems in employing microorganisms to oxidize the emulsions of oil or thin films is that the bacteria only exist in small amounts and in order to be effective, large quantities had to be developed. Once the bacteria metabolize the oil, they die. The end product produces just as in auto or chemical oxidation, alcohols, fatty acids, ketones and other emulsified products which have no harmful effects on the existing marine environment.

In the prior art, microorganisms have been used to convert oil to protein. For example, U.S. Pat. No. 2,769,750 discloses admixing particulate anhydrous inert adsorbents with hydrocarbons and/or oxygenated hydrocarbons. This homogenous mixture is further mixed with a nutrient and inoculated with hydrocarbon-consuming microorganisms. The adsorbents are normally added in sufficient amounts so that the adsorbent hydrocarbon mixture is a dry powder. The adsorbents are preferably naturally occurring clays, such as kaolinic clay. Further bacterial cultures have been freeze-dried, one technique being disclosed in U.S. Pat. No. 3,261,761. That process involves growing a culture in the presence of a metal salt such as NaCl; diluting the culture with buffer and sugar solutions; pre-cooling it to 0°C to 1°C, reducing its temperature to −5°C or lower by applying a vacuum and subliming off the moisture by maintaining it at −5°C or below. Concerning other techniques of drying microorganisms, U.S. Pat. No. 2,919,194 discloses suspending fine particles of wet yeast in a liquid and drying the suspended yeast by evaporating the water. The water evaporation is done by contact with a stream of inert gas. This patent teaches this type of drying as preferred when yeast cells are being processed. U.S. Pat. No. 3,224,946 relates to the use of synthetic or natural zeolites in microbial conversion of hydrocarbons to other products. The hydrocarbons are absorbed on the molecular sieves or within their crystalline pore structure. The hydrocarbon containing zeolites are contacted with the water containing the necessary nutrients and hydrophilic microbes are added. This allows the microbes to retain contact with its nutrient source and yet attack the hydrocarbons. It can readily be appreciated that there would be extreme difficulties in using this system to eliminate oil slicks on large, open bodies of water, if it could be used in that manner at all. To further illustrate the unpredictability of such a use, the patent discloses that asbestos and bentonite failed to perform as the zeolite.

A South African Patent bearing Serial No. 708,672 discloses and claims compositions and methods for removing oils and other hydrocarbons from surfaces such as shorelines and those of fresh and salt water whether contained or essentially open. The fresh and salt water surfaces may be those of natural or man-made bodies of water or water contained in tanks or other containers. The compositions preferably comprise freeze drying microorganisms along with nutrients or microorganisms within a carrier material or microorganisms within a carrier also containing nutrients. For removal of a hydrocarbon or oil any of these compositions or a mixture is placed on the hydrocarbon or oil deposit to be removed. The oil or hydrocarbon is then digested by the microorganisms.

There is no teaching in this patent that beaches, jetties, rocks, cement and the like can be pretreated with freeze-dried microorganisms to prevent the accumulation of oil thereon.

While the present invention is applicable to a broad scope of operable microorganisms, there are a number of microorganisms which are especially suitable for dispersing and degrading oil spilled as well as preventing the accumulation of oil on beaches, rocks, jetties and the like. These species were specially selected by elective cultures and screening techniques upon a wide variety of hydrocarbons. The hydrocarbon dispersing and degrading microorganisms useful in this invention include bacteria, yeasts, actinomyces and filamentous fungi. Examples of specific useful aerobic species of microorganisms are: Corynebacterium, Brevibacterium Job 5, *Alcaligines entrophus, Pseudomonas aeruginosa, Pseudomonas fluorescens, Pseudomonas Oleovorans, Pseudomonas putida, Pseudomonas desmolyticum, Pseudomonas methanica, Micrococcus paraffinae, Acetobacter peroxydans, Mycobacterium smegmatis, Mycobacterium thodochrous, Achromobacter agile, Achromobacter centropunctatum, Arthrobacter, Bacillus hexacarbovorum, Candida lipolytica, Candida tropicalis, Candida utilis, Candida parasilosis, Candida guilliermondii, Candida rugosa, Trichosporan cutaneum, Aureobasidium pullulans, Pichia spartinae, Pichia saitoi, Torulopsis pullulans, Torulopsis gropengiesseri, Nocardia opacus, Nocardia corrallina, Actinomyces oligocarbophilus, Aspergillus versicolor, Penicillium sp* and *Graphium ulni*. Among the anaerobic microorganisms useful in the hydrocarbon dispersion and degradation are *Desulfovibrio desulfuricans, Rhodopseudomonas palustris*. The microorganisms are tabulated hereinbelow along with their corresponding ATCC registration numbers which were secured by depositing samples with the American Type Cultural Collection, 212 M Street, N.W., Washington, D.C.

TABLE I

| Division | Class | Order | Family | Tribal Genus | Species | No. ATCC |
|---|---|---|---|---|---|---|
| I* Protophyta | II Schizomycetes | IV Eubacteriales | XII Corynebacteriaccae | IV Arthrobacter | Arthrobacter Nov. Sp. | 21908 |
| I* Protophyta | II Schizomycetes | IV Eubacteriales | VII Micrococcaccae | I Micrococcus | Micrococcus denitrificans | 21909 |
| I* Protophyta | II Schizomycetes | IV Eubacteriales | III Achromobacteriaceae | II Achromobacter | Achromobacter Nov. Sp. | 21910 |

* Hereinafter the mixture of these three bugs is designated as EM-30

TABLE II

BIOCHEMICAL TEST RESULTS ON ARTHROBACTER
(White Smooth E-M-30-W)

| Test No. and Name | Results + | Results − | Description and Remarks |
|---|---|---|---|
| 1. Simple Stain | | | Aerobic, nonpigmented, nonmotile gram-variable rods, irregular shape and size generally 0.5 to 0.7 by 1.0 to 3.0 microns, occurring in angular arrangement cells may be curved. Slightly bent or frequently swollen. Frequently branching, older cultures, developing coccoid cells which give rise to rod forms during germination in fresh medium. |
| 2. Gram Stain | | | GRAM VARIABLE. |
| Raffinose Broth | | X | No acid, no gas |
| Dulcitol Broth | | X | No acid, no gas |
| Salicin Broth | | X | No acid, no gas |
| Sorbitol Broth | | X | No acid, no gas |
| Maltose Broth | | X | No acid, no gas |
| 3. Motility | | | NON-MOTILE |
| Rhamnose Broth | | X | No acid, no gas |
| Xylose Broth | | X | No acid, no gas |
| 4. Colony Morphology | | X | Smooth but not wet and running. Even edges. |
| Blood agar | | | No hemolysis |
| Potato dextrose | X | | Good growth |
| Pseudocell | | | Very slight growth (isolated small colonies only). |
| 5. Chromogenesis | | | |
| EMB | | | Good growth, No metallic sheen |
| 6. Contamination check | | | Pure |
| Loeffler Medium | | X | Good growth but no liquefaction. |
| 7. Catalase | | X | |
| 8. Gelatin Liquefaction | | | |
| 9. Indole Production | | X | |
| 10. Nitrate Reduction | | X | |
| 11. Nitrite | | X | |
| 12. Glucose | | X | No acid, no gas |
| 13. Lactose | | X | No acid, no gas |
| 14. Sucrose | | X | No acid, No gas |
| 15. Starch | | X | No hydrolysis |
| 16. Seller's Diff. Agar | | | Green Butt, Blue-green slant, gas on side. |
| 17. Mannitol | | X | No acid, no gas |
| 18. SIM | | X | |
| 19. Citrate | | | Light growth |
| 20. Casein | | | |
| 21. Litmus Milk | | | Curdle solid, light beige (pH 5.6) |
| 22. M.R.V.P. | | X | |
| 23. TSI | | | Alkaline slant, no change in cut, no H$_2$S, no gas. |
| 24. Urea | | X | No acid, no gas |
| 25. Inositol Broth | | X | No acid, no gas |
| 26. Galactose Broth | | X | No acid, no gas |
| 27. Inuline Broth | | | |
| 28. Oxidase | | X | |
| 29. Hexadecane | X | | |

TABLE III

BIOCHEMICAL TEST RESULTS ON MICROCOCCUS DENITRIFICANS
(Mucoid E-M-30-M)

| Test No. and Name | Results + | Results − | Description and Remarks |
|---|---|---|---|
| 1. Simple Strain | | | Aerobic, nonmotile gram-negative short rod-shaped cells of 0.4 to 0.5 by 2.0 microns occurring singly, in pairs and short chains, nonpigmented. |
| 2. Gram Stain | | X | Negative |
| Raffinose Broth | | X | No acid, no gas |
| Dulcitol Broth | | X | No acid, no gas |
| Salicin Broth | | X | No acid, no gas |
| Sorbitol | | X | No acid, no gas |
| Maltose | | X | No acid, no gas |
| 3. Motility | | X | |
| Rhamnose | | X | No acid, no gas |
| Xylose | | X | No acid, no gas |
| 4. Colony Morphology | | | Very wet, running colony. Even edges. |
| Blood Agar | | X | No hemolysis |
| Potato Dextrose | X | | Extremely wet mucoid runny growth. |
| Pseudocell Agar | | X | No growth |
| 5. Chromogenesis | | | Cream color |
| EMB | | | Good growth, very mucoid water growth, no metallic sheen. |
| 6. Contamination Check | | | Pure |
| Loeffler Medium | | | No growth |
| 7. Catalase | | X | |
| 8. Gelatin Liquefaction | | X | |
| 9. Indole Production | | X | |
| 10. Nitrate Reduction | X | | |
| 11. Nitrite Reduction | X | | |
| 12. Glucose | | X | No acid, no gas |
| 13. Lactose | | X | No acid, no gas |
| 14. Sucrose | | X | No acid, no gas |
| 15. Starch | | X | Luxuriant growth, no hydrolysis |
| 16. Seller's Differential | | | Blue slant, blue butt, gas on sides |
| 17. Mannitol | | X | No acid, no gas |
| 18. SIM | | X | No $H_2S$, no motility, no indole |
| 19. Citrate | X | | |
| 20. Casein | | | |
| 21. Litmus milk | | X | No curdles, no color change (pH 6.7) |
| 22. M.R.V.P. | | X | |
| 23. TSI | | X | Alkaline Slant, no change in butt, no $H_2S$, no gas |
| 24. Urea | X | | Reaction time 2 hours at 37°C |
| 25. Inositol | X | | No acid + gas pellicle formation |
| 26. Galactose | | X | No acid, no gas pellicle formation |
| 27. Inulin | | X | No acid, no gas |
| 28. Oxidase | X | | |
| 29. Hexadecane | X | | |

TABLE IV

BIOCHEMICAL TEST RESULTS ON ACHROMOBACTER
(Yellow E-M-30-X)

| Test No. and Name | Results + | Results − | Description and Remarks |
|---|---|---|---|
| 1. Simple Stain | | | Aerobic, producing non-diffusible pigment rods, motile by means of peritrichous flagella. Gram-negative. Rods normally are 0.8 to 1.0 by 1.0 to 5.0 microns |
| 2. Gram Stain | | X | Negative |
| Raffinose Broth | | X | No acid, no gas |
| Dulcitol Broth | | X | No acid, no gas |
| Salicin Broth | | X | No acid, no gas |
| Sorbitol Broth | | X | No acid, no gas |
| Maltose Broth | | X | No acid, no gas |
| 3. Motility | | X | |
| Rhamnose Broth | | X | No acid, no gas |
| Xylose Broth | | X | No acid, no gas |
| 4. Colony Morphology | | | Smooth, not wet or runny. Even edges. |
| Blood Agar | | X | No hemolysis |
| Potato Dextrose | | | Very light growth |
| Pseudocell | | X | No growth |
| 5. Chromegenesis | | | Yellow pigment on colony |
| EMB | | X | Good growth, purple but no metallic sheen |
| 6. Contamination Check | | | Pure |
| Loeffler Medium | | X | No growth |
| 7. Catalase | | X | |
| 8. Gelatin Liquefaction | | | |
| 9. Indole Production | | X | |
| 10. Nitrate Reduction | | X | |
| 11. Nitrite Reduction | | X | |
| 12. Glucose | | X | No acid, no gas |
| 13. Lactose | | X | No acid, no gas |
| 14. Sucrose | | | No acid, no gas |
| 15. Starch | | X | Growth but no hydrolysis |
| 16. Seller's Defferential | | | Blue slant, blue butt, gas at bottom |
| 17. Mannitol | | X | No acid, no gas |

TABLE IV—Continued

BIOCHEMICAL TEST RESULTS ON ACHROMOBACTER (Yellow E-M-30-X)

| Test No. and Name | + | − | Description and Remarks |
|---|---|---|---|
| 18. SIM | | X | Np $H_2S$, no gas, no indole |
| 19. Citrate | X | | |
| 20. Casein | | | |
| 21. Litmus Milk | | X | Light curdles, no change in color (pH6.7) |
| 22. M.R.V.P. | | X | |
| 23. TSI | | | Alkaline slant, alkaline butt, no $H_2S$, no gas |
| 24. Urea | | X | |
| 25. Inositol Broth | | X | No acid, no gas |
| 26. Galactose Broth | | X | No acid, no gas |
| 27. Inulin Broth | | X | No acid, no gas |
| 28. Oxidase | X | | |
| 29. Hexadecane | X | | pH 5.0 |

TABLE V

BIOCHEMICAL TEST ON (E-M-30 MIXTURE OF W-M-Y)

| Test No. and Name | + | − | Description and Remarks |
|---|---|---|---|
| 1. Simple Stain | | | |
| 2. Gram Stain | | | Gram Negative and Positive |
|    Raffinose Broth | | X | No acid, no gas |
|    Dulcitol Broth | | X | No acid, no gas |
|    Salicin Broth | | X | No acid, no gas |
|    Sorbitol Broth | | X | No acid, no gas |
|    Maltose Broth | | X | No acid, no gas |
| 3. Motility | | | |
|    Rhamnose Broth | | X | No acid, no gas |
|    Xylose Broth | | X | No acid, no gas |
| 4. Colony Morphology | | | |
|    Blood Agar | | | Hemolysis |
|    Potato dextrose | | | Very good growth |
|    Pseudocell Agar | | | Slight Growth |
| 5. Chromogenesis | | | |
|    EMB | | | Growth, no metallic sheen |
| 6. Contamination Check | | | |
|    Loeffler Medium | | | Good Growth |
| 7. Catalase | | X | |
| 8. Gelatin Liquefaction | | X | |
| 9. Indole Production | | X | |
| 10. Nitrate Reduction | X | | |
| 11. Nitrite Reduction | X | | |
| 12. Glucose | | X | No acid, no gas |
| 13. Lactose | | X | No acid, no gas |
| 14. Sucrose | | X | No acid, no gas |
| 15. Starch | | X | No hydrolysis |
| 16. Seller's Diff. Agar | | | |
| 17. Mannitol | | | |
| 18. SIM | | | No $H_2S$, no indole |
| 19. Citrate | X | | |
| 20. Casein | | X | No hydrolysis |
| 21. Litmus Milk | | | No change in color, very slight curdling |
| 22. M.R.V.P. | | X | No Acetyl Methyl Carbinol |
| 23. TSI | | | Alkaline, no change in butt, no $H_2S$, no gas |
| 24. Urea | X | | Reaction time 2 hours at 37°C. |
| 25. Inositol Broth | | | No acid, no gas |
| 26. Galactose Broth | | | No acid, no gas |
| 27. Inulin Broth | | | No acid, no gas |
| 28. Oxidase | | | |
| 29. Hexadecane | X | | Good growth |

In the practice of our invention, a carefully selected suitable mixture of microorganisms enumerated hereinabove, is admixed with an inert substance. The inert substance is one selected from the group consisting of celite, cellulose powder, wood shavings, sawdust, cab-o-sil or Silicagel which is precipitated silicic acid having the general formula $H_2SiO_3$, diatomaceous earth, kaolin, asbestos powder, asbestos fibers, finely ground sand, ground glass powder, oyster shell powder, clam shell powder.

The following examples of anions and cations having generally chemical formulas have been found useful as adsorbents.

TABLE VI

AMBERLITE AND AMBERLYST ION EXCHANGE RESINS

| CAT NO. | MESH PARTICLE SIZE | IONIC FORM | STRUCTURE MATRIX & PERCENT CROSS LINKAGE | WEIGHT meq/g(dry) |
|---|---|---|---|---|
| ANION EXCHANGE RESINS | | | | |
| *4704 Amberlite IR-4B AR | 20–50 | OH | PPF | 10.0 |
| 4705 Amberlite CG-4B AR | 100–200 | OH | PPF | 8.0 |

TABLE VI—Continued

AMBERLITE AND AMBERLYST ION EXCHANGE RESINS

| CAT NO. | | MESH PARTICLE SIZE | IONIC FORM | STRUCTURE MATRIX & PERCENT CROSS LINKAGE | WEIGHT meq/g(dry) |
|---|---|---|---|---|---|
| 4706 | Amberlite CG-4B AR | 200–400 | OH | PPF | 8.0 |
| 4707 | Amberlite IR-45 AR | 20–50 | OH | S-DVB | 5.0 |
| 4708 | Amberlite IRA-400 AR | 20–50 | Cl | S-DVB-8X | 3.3 |
| 4709 | Amberlite CG-400 AR | 100–200 | Cl | S-DVB-8X | 3.3 |
| 4710 | Amberlite CG-400 AR | 200–400 | Cl | S-DVB-8X | 3.3 |
| 4711 | IRA-401S AR | 20–50 | Cl | S-DVB-4X | 3.4 |
| CATION EXCHANGE RESINS | | | | | |
| 4698 | Amberlite IR-120 AR | 20–50 | H | S-DVB-8X | 5.0 |
| 4699 | Amberlite CG-120 AR | 100–200 | Na | S-DVB-8X | 4.5 |
| 4700 | Amberlite CG-120 AR | 200–400 | Na | S-DVB-8X | 4.5 |
| 4701 | Amberlite IRC-50 AR | 20–50 | H | PM | 10.0 |
| 4702 | Amberlite CG-50 AR | 100–200 | H | PM | 10.0 |
| 4703 | Amberlite CG-50 AR | 200–400 | H | PM | 10.0 |

* Kunin, R. 1960 Elements of Ion Exchange, Reinhold Publishing Corporation, New York Marinsksy, J.A. 1966 Ion Exchange Vol. 1, Marcel Dekker, New York Boardman, N.K. 1969 Ion Exchangers and Gel Filtration Media, Chapter 22, Pages 593-603 Data for Biochemical Research, 2nd Edition, Edited by R.M.C. Dawson, Daphne C. Elliott, W. H. Elliott and K. M. Jones. Oxford University Press, New York and Oxford, U.K.

In addition, the following adsorbents have been found useful in this invention: DEAE-Sephadex A-25 and A-50, having the general formula $-C_2H_4N^+(C_2H_5)_2N$, which is a weakly basic anion exchanger; QAE-Sephadex A-25 and A-50 having the general formula $-C_2H_4N^+(C_2H_5)_2CH_2CH(OH)CH_3$ strongly basic anion exchanger; CM Sephadex C-25 and C-50 having the general formula $-CH_2COO^-$ weakly acidic cation exchanger and SP Sephadex C-25 and C-50 having the general formula $-C_3H_6SO_3^-$, a strongly acidic cation exchanger. (Porath, J., 1963, J. Appl. Chem.).

The preferred carrier materials when used include clays such as kaolin, zeolites and other microporous silicaalumina materials, silica gels, vermiculities and perlites, and particularly these in hydrophillic forms. The operable materials, however, include microporous materials of the class into which microorganisms and nutrients or microorganisms alone can be absorbed and freeze-dried, and which will subsequently adsorb oil so as to bring this oil into a close relationship with the microorganisms for digestion. A particularly preferred material is vermiculite and ideally an exfoliated vermiculite. Vermiculite as used herein refers to the group of rock-forming mineral species characterized by a layer of latticized structure 10A which the silicatelayer units have a thickness of approximately 10a (Angstrom units). The main elements present in the layer are magnesium, aluminum, silica, iron and oxygen with the latter being separated by one or two sheets of water molecules associated with cations, such as magnesium, calcium, sodium and hydrogen. The layers have considerably lateral extent relative to the thickness of the basic 10 Angstrom-unit layer. Further, vermiculite belongs to the phyllosilicate group, which are characterized by the presence of Si—O sheets formed by the linkage of three corners of each $SiO_4$ tetrahedron to neighbors so that each tetrahedron has three shared and one free oxygen. The type formula is $Am(B_2X_5)_n$. Vermiculite has monoclinic hexagonal plates and a hardness of one.

The term "vermiculite" as used herein therefore includes minerals consisting wholly or largely of vermiculite, or minerals of a mixed-layer type containing vermiculite layers as an important constituent, such as hydrobiotites and chlorite-vermiculites. Unexfoliated vermiculite is an expanded vermiculite. For very effective use, the pore diameters of the microporous carriers should be in the range of 10A or greater, although smaller pore sizes in the range of 5A can be used. In regard to particle size this is not a critical factor, with sizes of from within the micron range up to a centimeter being useful. The particle size will be dependent to a degree on the particular microporous carrier being used, that is, for example, it will be different for an exfoliated and an unexfoliated vermiculite.

After admixing, the mixture is then dried at a temperature ranging from 25° to 55°C and preferably from 30° to 50°C so as to form an anhydrous powder. The drying temperature must be maintained within this range in order to ensure that the full biological activity and viability of the final product is maintained. Alternatively, the mixture can be lyophilized (freeze-dried) in order to form the said anhydrous powder.

In this form, the microorganisms can be stored until they are required for use in dispersing and degrading various oil spills.

At the time of use, the dry matter is reconstituted with an aqueous phase such as seawater so as to maintain the viability (Table VII) and biological activity of the microorganisms (Table VII). The reconstitution step requires vigorous mixing to avoid caking. The reconstituted liquid is then sprayed over an area containing an oil spill rapidly and evenly.

The microorganisms act on the film of oil and on the oil so as to break it up into smaller globules in a period of over four hours or less, the globule particle size in diameter decreases from 200 microns to approximately 20 to 40 microns. After the globules reach the size of 6 to 20 microns, the oxidation products are realized in

TABLE VII

VIABILITY OF LYOPHYLIZED BACTERIAL POOL EM-30 AND INDIVIDUAL ISOLATES

| LOT No. | TYPE | DAYS* STORED | VIABILITY CELLS/GRAM | %** VIABILITY | TIME FOR 100% DISPERSION OF No. 4H.O HOURS |
|---|---|---|---|---|---|
| 1. | EM-30 Bacterial pool | 5 | $1 \times 10^{10}$ | 1 | 1 |
| 2. | EM-30 | 12 | $3 \times 10^{10}$ | 3 | 1 |
| 3. | EM-30 | 20 | $2 \times 10^{10}$ | 2.5 | 1 |
| 4. | EM-30 | 90 | $9 \times 10^{8}$ | 0.1 | 1 |
| 5. | EM-30 | 90 | $9 \times 10^{8}$ | 0.1 | 1 |
| 6. | Arthrobacter ATCC No. 21908 | 3 | $4 \times 10^{10}$ | 5.0 | 0.5 |
| 7. | Micrococcus ATCC No. 21909 | 6 | $9 \times 10^{9}$ | 4.0 | 0.5 |
| 8. | Achromobacter ATCC. No. 21910 | 5 | $5 \times 10^{9}$ | 0.5 | 0.75 |

\* Wet cell paste stored at $-18°C$ prior to lyophylization.
\*\* Viability tested after a week of storage at ambient temperatures.

that the hydroxides, alcohols, aldehydes, and acids are formed by the microorganisms, then die. When the assimiable nutrients are exhausted, there is in fact, no contamination of the sea water by the microorganisms themselves.

It has also been found that when sand, rocks, concrete, metals, plastics and so forth are treated with a water slurry of the above-described microorganisms such materials are not readily contaminated by oil. It was found that plastic in contact with oil acquires a rather tenacious oil film in the absence of treatment with the described microorganisms. However, after the plastic is treated with a water slurry of the microorganisms by dipping the plastic into the slurry followed by draining, oil no longer stick to the plastic. Similar tests were conducted on metals, gears, rocks and sand.

The concentration of the viable cells per mole of slurry ranges from $10^5$ to $10^8$. These microorganisms also can be employed for recovering petroleum oil from oil-bearing earth formations and can be useful in the secondary and tertiary recovery of petroleum oil from such formations.

The process of this invention of preparing freeze-dried cultures of selected bacterial species of hydrocarbon consuming microorganisms involves growing the mixed population in a suitable aqueous medium containing high inorganic phosphate concentration and a suitable easily assimiable inorganic nitrogen source, trace metals and a hydrocarbon containing $C_8$ to $C_{18}$ carbons as the only carbon source. Generally the mixed culture is produced in gram quantities in 20 to 50 liter quantities under vigorously aerated and agitated conditions. After the cell density has reached the desirable concentration, it is then preferably centrifuged to collect the cells and lyophilized or directly freeze-dried or adsorbed on to a suitable carrier selected from the inert supports described in this invention. The latter procedure is preferred since the desired amounts of nutrients are already present in this spent broth. In use, the preparation is generally reconstituted in suitable aqueous medium such as water or sea water and applied onto the oil or hydrocarbon surfaces or sprayed on the solid surfaces such as beaches, rocks, shore lines, to prevent oil contaminating the solid surfaces.

Table VII sets forth the viability of the bacterial pool during storage at $-18°C$ prior to lyophylization and also the viability of lyophilized preparations after a week of storage at ambient temperatures. In addition, Table VII also sets forth the ability of the lyophylized preparations to disperse No. 4H.O heating oil in laboratory tests.

By employing the microorganisms in the manner shown and described hereinabove they produce a solution to the problems of not getting a large enough quantity into an oil slick in order to effectively accomplish its dispersion and degradation. The above procedure is inexpensive to prepare, easy to store and convenient to transport wherever needed. By following this procedure a high degree of cell viability is maintained with no loss of biological activity when stored at ambient temperatures in sealed drums under an atmosphere of an inert gas such as nitrogen.

The invention will be further shown by the following examples:

EXAMPLE 1

The growth and utilization of various hydrocarbons by the bacterial pool consisting of *Arthrobacter Nov. sp.* ATCC No. 21908, *Micrococcus denitrificans* ATCC No. 21909 and *Achromobacter Nov. sp.* ATCC No. 21910 was evaluated by determining the growth of the above strains produced in a Basal salts medium supplemented with 0.2% V/V N-paraffins, diesel fuel oil No. 850, heating oil No. 2, Heating oil No. 4, unsubstituted and substituted aromatics and condensed rings. Table VIII sets out a series of typical hydrocarbons found in crude oil and oil fractions and their utilization by the microorganisms described herein.

TABLE VIII

GROWTH OF EM-30 MIXTURE IN BASAL SALTS MEDIUM SUPPLEMENT WITH 0.2% V/V n-PARAFFINS AND AROMATICS

| Substrate | Growth at 30°C (86°F) After Incubation for | | | |
|---|---|---|---|---|
| | 18 Hrs. | 24 Hrs. | 36 Hrs. | 48 Hrs. |
| Hexane | − | − | − | − |
| Octane | − | − | − | − |
| Decane | + | + | + | + |
| Hexadecane | + | + | + | + |
| Kerosene | − | + | + | + |

TABLE VIII—Continued

GROWTH OF EM-30 MIXTURE IN BASAL SALTS MEDIUM
SUPPLEMENT WITH 0.2% V/V n-PARAFFINS AND AROMATICS

| Substrate | Growth at 30°C (86°F) After Incubation for | | | |
|---|---|---|---|---|
| | 18 Hrs. | 24 Hrs. | 36 Hrs. | 48 Hrs. |
| Diesel Fuel No. 850 | + | + | + | + |
| Heating Oil 2 | + | + | + | + |
| Heating Oil 4 | + | + | + | + |
| Benzene | − | − | − | − |
| Phenol | − | − | + | + |
| Toluene | − | − | ± | + |
| Naphthalene | − | − | − | − |
| Thiophene | − | − | − | − |
| Thionaphthalene | − | − | − | − |
| Dibenzothiophene | ± | + | + | + |

50 ml of Basal Salts medium in 300 ml of baffled flakes was supplemented with 0.2% V/V filter sterilized hydrocarbons. Inoculated flakes were incubated on New Brunswick Rotary Shaker describing (1 inch stroke) 200 RPM at 30°C. Growth or no growth was adjudged by increase in turbidity.

EXAMPLE 2

The rate of dispersion of No. 4 Heating oil by microbial pool and the individual isolates *Arthrobacter Nov. Sp.* ATCC No. 21908, *Micrococcus denitrificans* ATCC No. 21909 and *Achromobacter Nov. sp.* No. 21910 was investigated in a series of shake flask experiments. The results are presented in Table IX.

TABLE IX

THE RATE OF DISPERSION OF NO. 4 HEATING OIL BY EM-30, AND INDIVIDUAL ISOLATES IN SHAKE FLASKS

| Microorganism | % Dispersion After | | | |
|---|---|---|---|---|
| | 1 Hr | 2 Hrs | 3 Hrs | 4 Hrs |
| EM-30 (Mixture) | 52 | 80 | 100 | — |
| Arthrobacter Sp. | 40 | 55 | 68 | 68 |
| Micrococcus Sp. | 35 | 80 | 100 | — |
| Achromobacter Sp. | 22 | 52 | 68 | 68 |

Protocol:
50 ml of Basal Salts medium + 400 mg of No. 4 heating oil 10 mg of EM-30 or individual isolates. Incubated at 24°C. Agitation 100 RPM (New Brunswick Rotary Shaker). Samples were analyzed for dispersion at hours shown.

It is evident from the results that EM-30 (microbial pool) dispersed the No. 4 heating oil in 3 hours. Among the individual isolates, Micrococcus sp. exhibited similar potency, whereas Arthrobacter sp. and Anchromobacter sp. dispersed only 68% of the oil by the end of 4 hours of incubation.

EXAMPLE 3

Mechanism of Microbial Oil Dispersion

In order to determine the mechanism(s) adopted by these hydrocarbonophilic microorganisms a series of experiments were conducted. The affinity of the bacterial pool for oil and the initial changes in the physical nature of the oil were determined by examining a sample of oil from control and reaction flasks at 0, 10 and 20 minutes under phase contrast microscope. The results recorded are that initially the single oil globule is surrounded by a thin film of water and the oil-water interface is coated by bacteria. After the 20 minutes of exposure to the microorganisms the oil droplets are further reduced in size and after further incubation the continuous film forming property of the oil is lost and the inherent property of the oil to adhere to the solid surfaces such as glass, paper, wood and polyethylene, polypropylene, sand and rocks. Finally, the system becomes homogeneous and all oil washes away.

EXAMPLE 4

To determine whether the property of the bacterial pool herein referred to an EM-30 to disperse and degrade No. 4 Heating oil was unique, additional tests were conducted using several typical crude oils and two oil blends, heating oils No. 4 and No. 6. The rate of dispersion of total crudes and heating oils was determined by inoculating calculated amounts of EM-30 into a Basal Salts aqueous medium supplemented with 1% V/V of the crude oils and heating oils listed in Table X. The inoculated flasks were incubated on a New Brunswick rotary shaker describing 100 RPM and maintained at 24°C. After periods specified, percent oil dispersed in each system was determined. The results are tabulated in Table X and they were essentially the same set forth in Example 2.

TABLE X

THE DISPERSION OF TOTAL CRUDES AND NO. 4 AND NO. 6 HEATING OILS BY BACTERIAL POOL EM-30 AT 24°C AND 100 RPM SHAKE FLASK EXPERIMENT

| Oil Type | % Dispersion After Hrs | | | |
|---|---|---|---|---|
| | ½ | 1 | 2 | 3 |
| Prudhoe Bay Crude | 78 | 100 | — | — |
| Hawkins Crude | 20 | 50 | 100 | — |
| Zolia Crude | 20 | 45 | 85 | 100 |
| North Zeta Crude | 30 | 50 | 75 | 100 |
| Sweden Crude | 25 | 55 | 90 | 100 |
| Mississippi Crude | 20 | 40 | 80 | 100 |
| Milliman Crude | 35 | 60 | 95 | 100 |
| No. 4 Heating Oil | 40 | 70 | 100 | — |
| No. 6 Heating Oil | 5 | 10 | 20 | 35 |

EXAMPLE 5

Carbon Balance Studies

EM-30 and the 3 isolates were investigated in depth for their ability to utilize No. 4 heating oil as the sole source of carbon for growth and energy. The experiments were designed to trap all $CO_2$ evolved in a series of sodium hydroxide absorption towers over the entire period of the experiment. The $CO_2$ produced by the microbial metabolic activity was flushed from the system using $CO_2$-free dry air. The biomass increase was determined by first collecting the cells by centrifugation followed by a repeated extraction with benzene or toluene and a final wash with acetone. The cells were dried under a heat lamp under a flow of nitrogen. The rate of increase in the biomass over the course of the incubation period is presented in Table XI.

The residual oil was recovered from the solvent phase, pooled and concentrated by vacuum distillation under reduced pressure at 40°C. The recovered oil was weighed and further subjected to infrared, NMR and mass spectroscopic analyses to determine which fractions of crude oil were utilized. Additionally, recovered oil was analyzed by GC distillation chromatography techniques to identify what types of hydrocarbons were microbially metabolized. To determine whether EM-30 and the individual strains are able to utilize aromatic and polynuclears present in the crude oil, the recovered oil was further fractionated by a silica gel chromatographic technique. The paraffinic, olefinic, naphthenic series, aromatic and polynuclears were again analyzed by GC distillation, and mass spectrophotometric techniques.

It is concluded from the data presented in Tables XII and XIII that EM-30 and the 3 isolates selectively utilize linear paraffins, $C_{10}$ to $C_{32}$ carbon atoms. This is confirmed by the selective loss of —$(CH_2)$ groups.

Protocol: Basal salts medium supplemented with weighed amounts of No. 4 heating oil. Inoculum 10% V/V of 18 hours old cultures grown on Basal salts supplemented with 1% V/V hexadecane. Incubation temperature 30°C. Agitation 200 RPM (New Brunswick Rotary Shaker). Sterile, $CO_2$-free used as carrier gas. NaOH as $CO_2$ absorption towers. CONTROL flasks contained all the components except the inoculum.

TABLE XI

CARBON BALANCE FOR EM-30 AND THREE ISOLATES ON NO. 4 HEATING OIL

| Cell Type | Time Hours | Biomass Gain* Grams/Liter | Cell Carbon | $CO_2$ Carbon | Total Carbon | % Carbon Utilized | % Oil Utilized |
|---|---|---|---|---|---|---|---|
| EM-30 | 72 | 5.9 | 2.6 | 1.8 | 4.4 | 22.4 | 25.7 |
| (Mixture) | 196 | 7.2 | 6.5 | 1.7 | 8.2 | 41.6 | 47.8 |
| Arthobacter | 24 | 2.3 | 1.05 | 0.83 | 1.9 | 10.9 | 12.5 |
|  | 48 | 2.3 | 1.05 | 1.30 | 2.3 | 13.2 | 15.1 |
|  | 72 | 2.5 | 1.10 | 1.10 | 2.2 | 12.3 | 14.1 |
| Micrococcus | 24 | 1.6 | 0.68 | 1.02 | 1.7 | 10.1 | 11.6 |
|  | 48 | 1.4 | 0.63 | 1.21 | 1.8 | 10.3 | 11.8 |
|  | 72 | 2.5 | 1.12 | 1.51 | 2.6 | 13.9 | 15.9 |
| Achromobacter | 24 | 1.6 | 0.74 | 0.66 | 1.4 | 7.2 | 8.3 |
|  | 48 | 2.4 | 1.10 | 0.74 | 1.8 | 9.5 | 10.9 |
|  | 72 | 2.3 | 1.05 | 1.10 | 2.2 | 11.2 | 12.8 |

* Corrected for dry weight of inoculum.

TABLE XII

MASS SPECTROPHOTOMETRIC ANALYSIS OF AROMATIC FRACTION OF
NO. 4 HEATING OIL DEGRADED BY EM-30
ARTHROBACTER sp., MICROCOCCUS sp., AND ACHROMOBACTER sp.
AFTER 72 HOURS OF INCUBATION AT 30°C (86°F)

| | Wt. Percent | | | |
|---|---|---|---|---|
| | EM-30 | ARTHO | MICROCOCCUS | ACHROMO |
| Benzenes | 28.7 | 26.7 | 26.6 | 26.0 |
| Indans | 14.3 | 14.4 | 14.1 | 14.2 |
| Dinaphthenobenzenes | 10.0 | 10.0 | 10.2 | 10.3 |
| Trinaphthenobenzenes Naphthalenes | 15.5 | 15.2 | 14.5 | 15.3 |
| Acenaphthenes | 7.6 | 7.9 | 8.1 | 8.0 |
| Acenaphthalenes Dinaphthenonaphthalenes | 12.3 | 12.7 | 13.0 | 12.8 |
| Trinaphthenonaphthalenes Naphthenoacenaphthalenes Phenanthenes | 2.7 | 2.7 | 2.8 | 2.9 |
| Diacenaphthalenes Cyclopentanophenanthrenes | 3.3 | 4.1 | 4.3 | 4.2 |
| Pyrenes | 0.0 | 0.0 | 0.0 | 0.0 |
| Chrysenes | 0.0 | 0.0 | 0.0 | 0.0 |
| Diaceanthracenes | 0.0 | 0.0 | 0.0 | 0.0 |
| Benzpyrenes | 0.0 | 0.0 | 0.0 | 0.0 |
| Benzothiophenes | 4.7 | 5.1 | 4.8 | 5.1 |
| Indanothiophenes | 0.0 | 0.0 | 0.0 | 0.0 |
| Dibenzothiophenes | 0.9 | 1.2 | 1.6 | 1.2 |
| Acenaphthenothiophenes | 0.0 | 0.0 | 0.0 | 0.0 |
| Acenaphthalenothiophenes | 0.0 | 0.0 | 0.0 | 0.0 |
| Phenanthrenothiophenes | 0.0 | 0.0 | 0.0 | 0.0 |
| Diacenaphthalenothiophenes Cyclopentanophenanthrenothiophenes | 0.0 | 0.0 | 0.0 | 0.0 |

TABLE XIII

SUMMARY OF % UTILIZATION OF VARIOUS FRACTIONS OF
NO. 4 HEATING OIL DEGRADED BY
ARTHROBACTER sp., MICROCOCCUS, AND ACHROMOBACTER sp. AFTER
72 HOURS OF INCUBATION AT 30°C (86°F)

| | Wt. Percent | | | |
|---|---|---|---|---|
| | EM-30 | ARTHRO | MICROCOCCUS | ACHROMO |
| Paraffins | 40.8 | 27.8 | 29.8 | 27.8 |
| Non-Cond. Naphthenes | 23.0 | 27.1 | 26.7 | 27.0 |
| 2 Ring Cond. Naphthenes | 19.4 | 23.7 | 22.5 | 23.6 |
| 3 Ring Cond. Naphthenes | 10.5 | 13.2 | 12.7 | 13.2 |
| 4 Ring Cond. Naphthenes | 4.5 | 5.8 | 5.8 | 5.9 |
| 5 Ring Cond. Naphthenes | 1.1 | 1.5 | 1.6 | 1.6 |
| 6 Ring Cond. Naphthenes | 0.3 | 0.3 | 0.3 | 0.3 |
| Mono-Aromatics | 0.4 | 0.6 | 0.6 | 0.6 |

EXAMPLE 6

The Effect of Temperature, pH, N and P on Dispersion Rates

The effect of temperature on the rate of dispersion of No. 4 heating oil by EM-30 was determined by incubating at temperatures from +5 °C to 40°C with a 5°C increment. Samples from each reaction flask were withdrawn at 10-minute intervals and percent dispersion of the oil was determined spectrophotometrically. The results are presented in Table XIV. At higher temperatures, the dispersion appears to be rapid. However, the optimum temperature range appears to be around 25°–35°C. It becomes difficult to define dispersion at temperatures lower than 10°C because of the concomitant oil viscosity decrease and the slowing down of the metabolism of the microorganisms. However, there appears to be no significant change in the dispersion rates between 5° and 15°C. These data suggest that the initial dispersion is dependent upon the particle size and amount of dispersant associated with the microbes. Apparently, the rate of initial dispersion by the microbial dispersant is independent of the temperature, however, further increase in the percent dispersion is closely associated with the optimum temperature for the biosynthesis of the dispersant.

Additional experiments suggested that the pH of the reaction mixture is not critical. However, assimilable sources of nitrogen and phosphate and trace metals are necessary for the increase in biomass, and associated activities such as dispersion, degradation and transformation of the oil. Similarly, the rate of oil dispersion by microbes is dependent upon the strains which are capable of utilizing some fractions of crude oil as sources of carbon for the growth and for the biosynthesis of the dispersant, size, temperature, agitation, presence of assimilable sources of nitrogen and phosphate, and the chemical composition of the crude oil.

TABLE XIV

EFFECT OF TEMPERATURE ON THE DISPERSION OF NO. 4 HEATING OIL BY EM-30

| Temperature (°C) | Time (minutes) to Achieve 10% Dispersion | 25% Dispersion | 50% Dispersion |
|---|---|---|---|
| 5 (41°F) | 60 | 90 | 120 |
| 10 (50°F) | 60 | 90 | 120 |
| 15 (59°F) | 40 | 60 | 100 |
| 20 (68°F) | 30 | 50 | 80 |
| 25 (77°F) | 20 | 30 | 60 |
| 4030 | (86°F) | 15 | 25 |
| 40 (104°F) | 10 | 20 | 30 |

EXAMPLE 7

Toxicity of EM–30 to Marine Life

The toxicity ($LD_{50}$) ppm of EM–30 was determined against *Artemia Salina* (Brine Shrimp) and *Fundulus Heteroclitas* (Minnow), scallop (bottom feeder) and phytoplankton (Algae) according to FWQA recommended official procedures.

In addition, the $LD_{50}$ (ppm) of recommended representative one crude oil and 2 heating oils alone and the dispersed oils, were determined for all the species. The results are presented in Table XV. The toxicity of lyophilized EM–30 in the basal salts medium supplemented with 1% V/V hexadecane to mice was determined by peritaneal injection of 5 mg of EM-30 per kg of mice body weight. None of the preparations were found to be toxic to mice at the dose level tested. Generally, the toxicity data, though limited to 4 marine and 1 terrestrial species, indicate that EM–30 is relatively less toxic than most chemical dispersants on the market. These are acute toxicity tests.

TABLE XV

TOXICITY OF EM-30 TO MARINE LIFE

| Test Organism | Brine Shrimp | Fish Minnow | Bay Scallop | Phyto-Plankton Algae |
|---|---|---|---|---|
| System ← | | $LD_{50}$[PPM] | | → |
| SLC*[1] | 2000–3000 | 1000–3000 | 2000–4000 | 200–800 |
| SLC+ EM-30[2] | <100 | >10,000 | 800 | 200–800 |
| No. 2H.O[3] | 400 | 3,000 | 4000 | 50 |
| No. 2H.O+ EM-30 | <100 | 2,000 | 400 | 100 |
| No. 6 H.O[4] | 3000–5000 | 4000–5000 | 7000–10,000 | 30 |
| No. 6 H.O+ EM-30 | 100–300 | >50,000 | 2000 | 30 |
| EM-30 | 300 | 5000 | 1000 | 100–1000 |

*[1] South Louisiana Crude
[2] Bacterial Pool
[3] No. 2 Heating oil
[4] No. 6 Heating oil

EXAMPLE 8

Effect of Pretreatment of Solid Surfaces (Plastic, Rock, Concrete and Metal) with Microorganisms on Tendency of Oil to Stick to Such Surfaces The procedure used was to pretreat the surface by dipping into a water slurry of the microorganisms. This was followed by spraying or dipping in the oil. To determine whether the oil sticks, the material was dipped or sprayed with water. In the case where the surface was pretreated, the oil readily came off, whereas the oil remained on the surface where the surface was not pretreated with the microorganisms. The surface so treated also had a lasting carryover effect. That is, the observed effect lasted after repeated washings of the surface.

TABLE XVI

| | Oil Film on Surface* Plastic (Plexiglas) | Mild Steel |
|---|---|---|
| Pretreatment | No oil film | No oil film |
| No Pretreatment | Oil film | Oil film |

* No. 6 Fuel oil (Heavy Bunker fuel)

A surface contaminated with the oil before treatment with the microorganisms could be cleaned using a water slurry of the microorganisms. However, this procedure required several hours of washing the oil-contaminated surfaces with the water slurry of the microorganisms. (Table XVII)

TABLE XVII

EFFECT OF WASHING SURFACE CONTAMINATED WITH OIL USING WATER SLURRY OF MICROORGANISM

| Wash With | Oil Film on Surface After 3 Hrs. | 5 Hrs. | 24 Hrs. |
|---|---|---|---|
| Water | Oil film (highly stained) | Oil film (highly stained) | Oil film (highly stained) |
| Water & Microorganism | Oil film (highly stained) | Oil film (some stain) | No oil film (clean) |

Table XVIII shows the data showing the beneficial effect of pretreating sand with the microorganisms prior to contamination with oil.

TABLE XVIII

EFFECT OF PRETREATMENT OF SAND WITH MICROORGANISMS ON TENDENCY OF OIL TO STICK

| Oil | % Oil Remaining on Sand | |
|---|---|---|
| | No Pretreat. | Pretreat. |
| Bachaquero crude | 40.0 | 6.5 |
| Laquinalles crude | 22.0 | 10.0 |

The method used in obtaining the data is outlined in Table XIX, which is an accepted test in the general area of evaluating beach cleaning efficiency.

TABLE XIX

LAB. TEST PROCEDURE - BEACH CLEANERS OIL CONTAMINATED BEACH SAND

Into a 250 ml cylindrical separatory funnel put 100 ml (160 grams) Ottawa sand, ASTM C-190, 20-30 mesh.
Add by pipette 20 ml of the oil.
Shake by hand 50 times.
Add 50 ml sea water plus microorganisms.
Shake 50 times, pause several minutes, shake 50 times.
Clamp the funnel into the Burrel Wrist Action Shaker, and while gently shaking sample*,

* Gentle shaking prevents erratic channelling of wash water through bed and standardizes this step for all tests. flush upwards with sea water until 500 cc of effluent collected.

Remove from shaker and drain remainder of water in stopcock.
Wash oil from sand, using chloroform. Use at least three washes, totaling at least 250 ml until effluent water-white.
Evaporate chloroform from tared beaker and weigh residue.
Extract flush water with chloroform and evaporate as an additional check.

EXAMPLE 9

Laboratory Pool Test

A laboratory program was thus initiated to test the feasibility of using the mixture of three microorganisms (EM-30) in laboratory pool tests designed to stimulate an oil slick on the open sea. A combination of large and small laboratory pool tests was used in this study. Good test results obtained in the small pools were always confirmed by conducting similar tests in the large laboratory pools.

The small laboratory pool test apparatus consisted of a rectangular-shaped pool (17 ½ × 11 × 5 inches) fitted with an 11-inch diameter windmill-type paddle. The paddle was rotated at 9 rpm and dipped to a maximum depth of 2 inches below the water surface; this generated waves of the frequency and intensity that one would encounter in the ocean on a very calm day. This agitation was so gentle that it was impossible to disperse any of the oil in the water column without the presence of microorganisms. Even a typical commercial chemical dispersant would not disperse oil under the mild agitation conditions used in these studies.

In the small laboratory pool test runs, seven liters of sea water and 7 g of oil were used. The oil was poured onto the surface of the water with the paddle stopped. The oil was allowed to spread and then the microorganism/sea water/nutrient slurry was poured over the oil slick. If nutrients were not used then the microorganisms/sea water slurry was simply made up without added nutrients.

The large pool apparatus consisted of a 6 ft. diameter circular pool, 18 inches deep, also equipped with a windmill-type paddle. In the large pool tests, 140 gallons of sea water was used which rose to a depth of 8⅝ inches in the pool. The paddle which was 44 inches in diameter dipped to a maximum depth of 4¾ inches below the water surface every 9 rpm. This test also simulated the ocean on a very calm day and appeared to be comparable to the small pools in this regard. The agitation in the large pools was also insufficient to disperse either the untreated oil or oil treated with a typical commercial chemical dispersant.

In the large laboratory pool tests, 500 g of the oil was poured onto the surface of the water with the paddle stopped. The oil was allowed to spread and then the microorganism/sea water slurry was sprayed over the oil slick. The sprayer was one typically used to spray pesticides around home gardens. When nutrients were used, the microorganisms were slurried in the nutrient solution and this mixture was sprayed onto the oil slick.

To determine the percent dispersion in both of these tests, a sample of the water was taken just off the bottom of the pools. The sample was then extracted with chloroform; the chloroform extracts were pooled and then diluted to 100 cc. The amount of oil in the sample was determined using a spectrophotometric technique.

Oil contents were determined spectrophotometrically using a Beckman model - DB Spectrophotometer. To determine the amount of oil, standard solutions of oil in chloroform were prepared and their optical densities determined at 350 MM. A linear relationship was shown to exist for the optical density vs. concentration. These standard plots were then used to determine the amount of oil dispersed by the microorganisms.

The results obtained in these studies are summarized in Table XX. The data shown in Table XX were obtained using a composite mixture of 3 bacterial Species *Arthrobacter Nov.Sp.* ATCC No. 21908, *Micrococcus denitrificans* ATCC No. 21909 and *Achromobacter Nov. Sp.* ATCC No. 21910.

TABLE XX

SUMMARY OF LABORATORY STUDIES INVOLVING FLOATING OIL SLICKS

| Parameters | Lab Pool Test Results |
|---|---|
| Oil Types | |
| — No. 4 Fuel Oil (Weathered and unweathered) | EM-30 culture: 24–48 hrs. |
| — No. 6 Fuel Oil | EM-30 culture: 72–96 hrs. |
| — Eight Crudes (See Attachment) | EM-30 culture: 24–48 hrs. |
| Temperature | Effective 45–80°F. |
| Sunlight (UV) | No significant effect. |
| Ratio of Oil/Organism | Effective 100:1 (Optimum 100:1 or greater). |

TABLE XX—Continued

SUMMARY OF LABORATORY STUDIES INVOLVING FLOATING OIL SLICKS

| Parameters | Lab Pool Test Results |
|---|---|
| Added Nutrients | Do not appear to be required; Sea water used contained adequate nutrient supply. |
| Agitation | Effective at extremely low levels; requires much less than typical chemical dispersants. |
| Preferred Method of Application | Spray on in form of slurry — lyophilized microorganism. |

The data in Table XXI in general, show that the microorganisms dispersed residual oils (No. 4 and No. 6 fuel oils) in the laboratory pool tests in 3 to 96 hours, depending on the oil and the microbiological system.

TABLE XXI

DISPERSION OF NO. 4 HEATING OIL IN SEA WATER BY BACTERIAL POOL (EM-30) IN A LABORATORY POOL TEST

| Hours | % Dispersion |
|---|---|
| 3 | 40 |
| 6 | 60 |
| 12 | 72 |
| 24 | 87 |
| 48 | 95 |

Further, a number of crudes were investigated in our laboratory studies in an effort to ascertain the range of applicability of the composite of microorganisms. Table XXII shows a list of the crudes investigated from the standpoint of ability of the microorganisms to disperse them in water. This list shows that the microorganisms are effective on a wide range of crudes. Since dispersion is the prelude to degradation, one can infer that these microorganisms also readily degrade these crudes.

Effect of Temperature

Our studies showed that the EM-30 effectively dispersed oil in the pool test over a temperature range of 45°-80°F, the rate of dispersion at the lower temperature being somewhat less than that at 80°F. For example, at 80°F, the No. 4 fuel oil was completely dispersed within 24 hours whereas at 45°F, it took 96 hours for complete dispersion. It can be inferred that oil degradation too proceeds much slower at the lower temperatures.

Effect of Sunlight (U.V.), Nutrient Level, and Oil/Microorganism Ratio

Experiments were conducted to ascertain the effect of sunlight (U.V.), nutrient level and oil/microorganism ratio on the rate at which the microorganisms disperse oil. Neither of these variables had any significant effect on the rate at which the microorganisms dispersed oil, nor was there an effect of oil/microorganisms ratio over the range studied, i.e., 100:1. The microorganisms were thus found to be equally effective in low and high intensity sunlight, with or without added nutrients, and at all ratios of oil to microorganisms studied, i.e. 100:1.

TABLE XXII

CRUDE OILS USED TO EVALUATE DISPERSION ABILITY OF EM-30

| | API Gravity | Wt. % S | Pour (°F) | Origin |
|---|---|---|---|---|
| Bachaquero | 16.8 | 2.4 | −10 | Venezuela |
| Rio Zulia | 40.9 | 0.30 | 45 | Colombia |
| East Central Texas | 37.7 | 0.22 | 30 | Texas |
| West Texas Light | 42.3 | 0.20 | −30 | Texas |
| La Rosa | 41.3 | 0.11 | 20 | Texas |
| Prudhoe Bay | 26.0 | 1.22 | −10 | Alaska |
| LaGunillas | 18.5 | 1.98 | −30 | Venezuela |

TABLE XXIII

EFFECT OF OIL/EM-30 RATIO ON DISPERSION OF NO. 4 HEATING OIL IN LABORATORY POOL TESTS

| Ratio Oil:Microorganism EM-30 | % Dispersion Hours | | | | |
|---|---|---|---|---|---|
| | 5 | 10 | 20 | 30 | 40 |
| 100:1 | 10 | 20 | 75 | 82 | 90 |
| 10:1 | 8 | 16 | 60 | 70 | 90 |
| 3.5:1 | 4 | 18 | 60 | 80 | 90 |

TABLE XXIV

EFFECT NUTRIENTS SUPPLEMENTATION ON THE DISPERSAL OF NO. 4 HEATING OIL BY EM-30 IN SEA WATER LABORATORY POOL TEST

| Supplementation | % Dispersion Hours | | | | |
|---|---|---|---|---|---|
| | 3 | 6 | 12 | 24 | 48 |
| No Nutrients | 30 | 50 | 70 | 87 | 98 |
| + Nutrients | 40 | 60 | 70 | 85 | 98 |

Effect of Inert Adsorbents on the Dispersion

The effect of an inert silica material, silica, was investigated in this program. The silica was mixed with the lyophilized microorganisms in a sea water-nutrient blend to form a slurry. This slurry was then charged to the oil slick in a laboratory pool herein described. The effect of silica gel on the rate at which the microorganisms dispersed No. 4 fuel oil is shown in Table XXV. These data show that the silica had a significant effect on the rate at which the microorganisms dispersed No. 4 fuel oil. In the presence of silica, the microorganisms dispersed 60% of the No. 4 fuel oil in only 20 hours as compared to about 40 hours without the silica.

TABLE XXV

EFFECT OF SILICA GEL ON NO. 4
HEATING OIL DISPERSION BY EM-30

| System | % Dispersion in Hrs. | | | |
|---|---|---|---|---|
| | 20 | 40 | 50 | 60 |
| EM-30 (Bacterial pool) | — | 50 | 82 | 95 |
| EM-30 + Silica gel | 660 | 90 | 95 | 100 |

Studies were conducted to ascertain the feasibility of using microorganisms either to clean beaches and rocks contaminated with oil or to prevent their contamination by oil. In this study, two different tests were used to evaluate the effectiveness of the microorganisms to clean oil from beaches (sand). These procedures are outlined in Tables XXVI and XXVII.

To study the effectiveness of the microorganisms to clean rocks contaminated with oil, the rocks were first dipped into sea water and then dipped into the oil, No. 4 fuel oil or No. 6 fuel oil. The rock coated with oil was then sprayed with a given quantity of water from a one pint squeeze bottle.

To study the use of microorganisms to protect rocks against possible oil contamination, the rocks were dipped into a sea water slurry of the microorganisms, drained and then dipped into the oil. The rocks were then sprayed with water from the squeeze bottle in a manner similar to that already described.

The results of these studies are qualitatively summarized in Table XXVIII. These data show that the microorganisms are also quite effective in cleaning beaches and solid surfaces contaminated with oil. Probably, more importantly, these microorganisms will prevent or minimize the contamination of beaches and solid surfaces with oil once they have been treated with the microorganisms.

TABLE XXVI
LAB TEST PROCEDURE - BEACH CLEANERS OIL CONTAMINATED BEACH SAND

Into a 250 ml cylindrical separatory funnel put 100 ml (160 grams) Ottawa sand, ASTM C-190, 20–30 mesh.
Add by pipette 20 ml of the oil.
Shake by hand 50 times.
Add 0.1 ml cleaner.
Shake 50 times.
Add 50 ml sea water.
Shake 50 times, pause several minutes, shake 50 times.
Clamp the funnel into the Burrel Wrist Action Shaker, and while gently shaking sample*, flush upwards with sea water until 500 cc of effluent collected.
Remove from shaker and drain remainder of water in stopcock.
Wash oil from sand, using chloroform. Use at least three washes, totaling at least 250 ml until effluent is water-white.
Evaporate chloroform from tared beaker and weigh residue.
Extract flush water with chloroform and evaporate as an additional check.

* Gentle shaking prevents erratic channeling of wash water through bed and standardizes this step for all tests.

TABLE XXVII

LAB TEST PROCEDURE - TEST BEACH CLEANING EFFECTIVENESS OF AGENTS 1800 g of sand spread to cover an area 6 × 18 inches graded from 1½ inch depth to ½° depth in a section of a container whose overall dimensions were: 18 × 18 inches × 3½°.
In the other portion of the container, 2 liters of sea water was added.
To keep the sand from being inundated the container is kept tilted.
The oil (15 g) was sprayed over the sand.
Half of the sand area was treated with microorganisms; the other half was untreated.
The sand area was washed with the water in the tray by tilting it up and down.
Observations were made concerning the cleanliness of the two areas on the sand.

TABLE XXVIII

SUMMARY OF LABORATORY STUDIES ON OIL CONTAMINATED BEACHES AND ROCKS

| Parameters | Results |
|---|---|
| Oil Types | Beaches |
| — No. 4 Fuel Oil and a variety of crudes | Completely removed from sand by the organisms within 10 mins. (25:1 oil/organism) (two different tests used). |
| — No. 6 Fuel Oil | Removes about 50% on repeated washings. If sand pretreated prior to contact with No. 6 oil all can be removed by washing with water. Rocks, (Wood, Plastic, Metal, etc.) |
| Oil Types | |
| — No. 4 and No. 6 Fuel Oils | Both oils are completely removed by organism/water slurry. Rocks can be protected by pretreatment with organism against both oils. |

What is claimed is:

1. A method for protecting beaches and shorline solid surfaces against oil contamination, said method comprising the steps of pretreating said beach or shoreline solid surface with a water slurry said water slurry prepared by admixing mutually compatible microorganism cells, said microorganism cells being selected from the group consisting of Arthrobacter, Micrococcus and Achromobacter, and mixtures thereof, with an inert absorbent substance; drying said mixture at a room temperature ranging from 25° to 55°C so as to form an anhydrous powder, reconstituting said anhydrous powder with an aqueous phase so as to generate a slurry thereby maintaining the viability and biological activity of the microorganism and coating said beach or shoreline solid surface with said aqueous slurry of viable mutually compatible microorganism cells.

2. A method according to claim 1 wherein the concentration of said microorganism cells ranges from $10^5$ to $10^8$ per mole of slurry.

3. A method according to claim 1 wherein the pretreating step consists of spraying the water slurry onto the beach or shoreline solid surface.

4. A method according to claim 1 wherein said shoreline solid surface is one selected from the group consisting of rocks, jetties and cement.

5. A process according to claim 1 wherein said mixture is dried at a temperature ranging from 30° to 50°C.

6. A method for protecting beaches and shoreline solid surfaces against oil contamination, said method comprising the steps of admixing mutually compatible microorganism cells, said microorganism cells being selected from the group consisting of Arthrobacter, Micrococcus and Achromobacter and mixtures thereof, with an inert absorbent substance, freeze drying said mixture so as to form an anhydrous powder, reconstituting said powder with an aqueous phase so as to generate a slurry thereby simultaneously maintaining the viability and biological activity of the microorganism, coating said beach or solid surface with said slurry prior to its being contacted with oil.

* * * * *